(No Model.)

A. H. FANCHER.
Sheet Metal Articles.

No. 243,232. Patented June 21, 1881.

WITNESSES.
Robert W. Matthews

INVENTOR.
Alton H. Fancher
per. James A. Whitney
Atty.

UNITED STATES PATENT OFFICE.

ALTON H. FANCHER, OF BROOKLYN, NEW YORK.

SHEET-METAL ARTICLES.

SPECIFICATION forming part of Letters Patent No. 243,232, dated June 21, 1881

Application filed February 28, 1881. (No model.)

*To all whom it may concern:*

Be it known that I, ALTON H. FANCHER, of Brooklyn, in the county of Kings and State of New York, have invented certain Improvements in Sheet-Metal Articles, of which the following is a specification.

This invention relates to the production of articles of sheet-tin, or equivalent sheet material, with joints so made and soldered that while the joint is rendered tight by the solder the latter is not suffered to appear at the inner side of the joint, so that the contents of any article of sheet metal formed with said joint will not be contaminated by contact with the solder.

Figure 1:
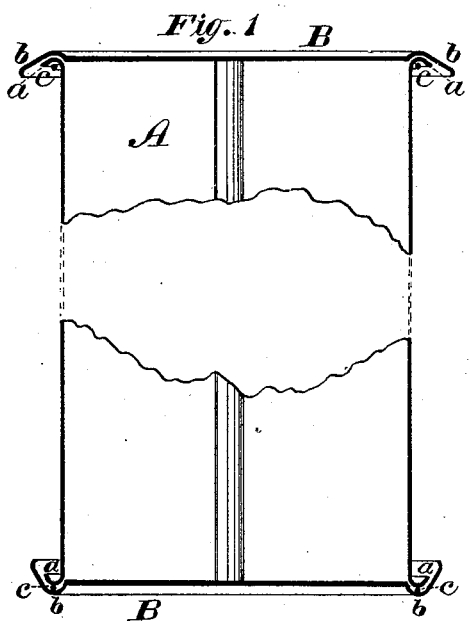
Figure 2:
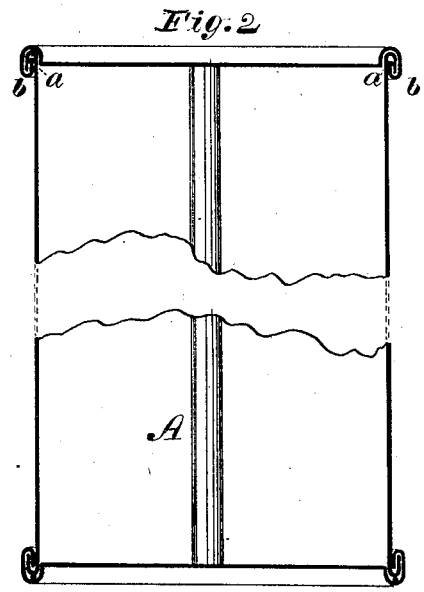
Figure 3:
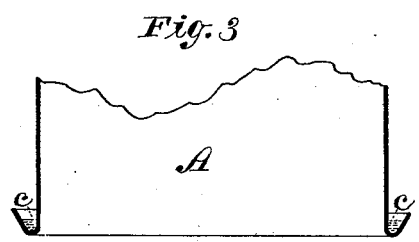

Figure 1 is a central longitudinal sectional view, representing the arrangement of the parts of a sheet-metal can preliminary to their union according to my said invention. Fig. 2 is a similar view, representing a completed sheet-metal can embracing my said invention. Fig. 3 is a detailed sectional view, illustrating a modified form of my said invention, and Fig. 4 is a transverse sectional view, showing my said invention so far as embraced in the longitudinal seam of a sheet-metal can.

In the practice of my said invention a suitable metallic soldering material is interposed between the folded edges of an interlocking sheet-metal joint in such manner that after the joint is mechanically formed the solder being inclosed within the joint may be melted by the application of heat to the external surface of the latter, thereby internally uniting the folded or interlocking edges without exposing the solder. So far as concerns the mechanical structure of the joint, it may be of any ordinary variety; but in general that represented in the drawings may be preferred.

A represents the body of an ordinary sheet-metal can, the end edges of which are turned outward and inward to form the circumferential flanges *a*. The heads or ends B have their circumferential edges shaped into the flanges *b*, so that when the said flanges *b* are folded or interlocked with the flanges *a* the two thus mechanically united will form the well-known interlocking joint. In the practice of my invention, however, preliminary to thus folding the edges together, the soldering material *c* is placed in such relation with the flanges *a b* that when the said flanges are folded or interlocked the said soldering material will be inclosed between or within them, as represented in Fig. 2.

Figure 4:
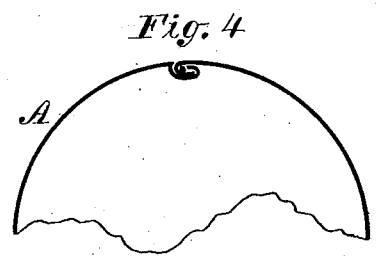

The soldering material may be applied either in the form of wire, as indicated in Figs. 1, 2, and 4, or it may be first supplied in a melted condition to the concavity or channel formed by the inner side of each of the flanges *a*, and as represented in Fig. 3.

When the soldering material is used in the form of wire it may be placed either at the inner side of the flanges *a*, as represented at the upper ends of Figs. 1 and 2, or it may be placed at the outer side of said flanges, as represented at the lower ends of said figures.

The invention is also applied in substantially the same way with reference to the longitudinal joint or seam of the can as it is to those of the ends. (See Fig. 4.)

The soldering material being thus inclosed within the mechanically-formed interlocking joint, the latter is heated by any suitable means to a degree sufficient to melt the solder, thereby soldering together the inner surfaces of the interlocking edges to form a hermetically-tight joint, devoid of any solder at its external surfaces.

What I claim as my invention is—

The method of forming the joints of articles of sheet metal, which consists in first turning the edges of the metal as required to interlock them, then inclosing the solder or fusible metal between them, and then subjecting the whole to the action of heat to melt the solder or fusible metal, substantially as and for the purpose herein set forth.

ALTON H. FANCHER.

Witnesses:
JAMES S. WHITNEY,
ROBERT W. MATTHEWS.